Dec. 12, 1939.   H. WHITAKER   2,182,888
OPEN HOLE FORMATION TESTER
Filed May 7, 1937
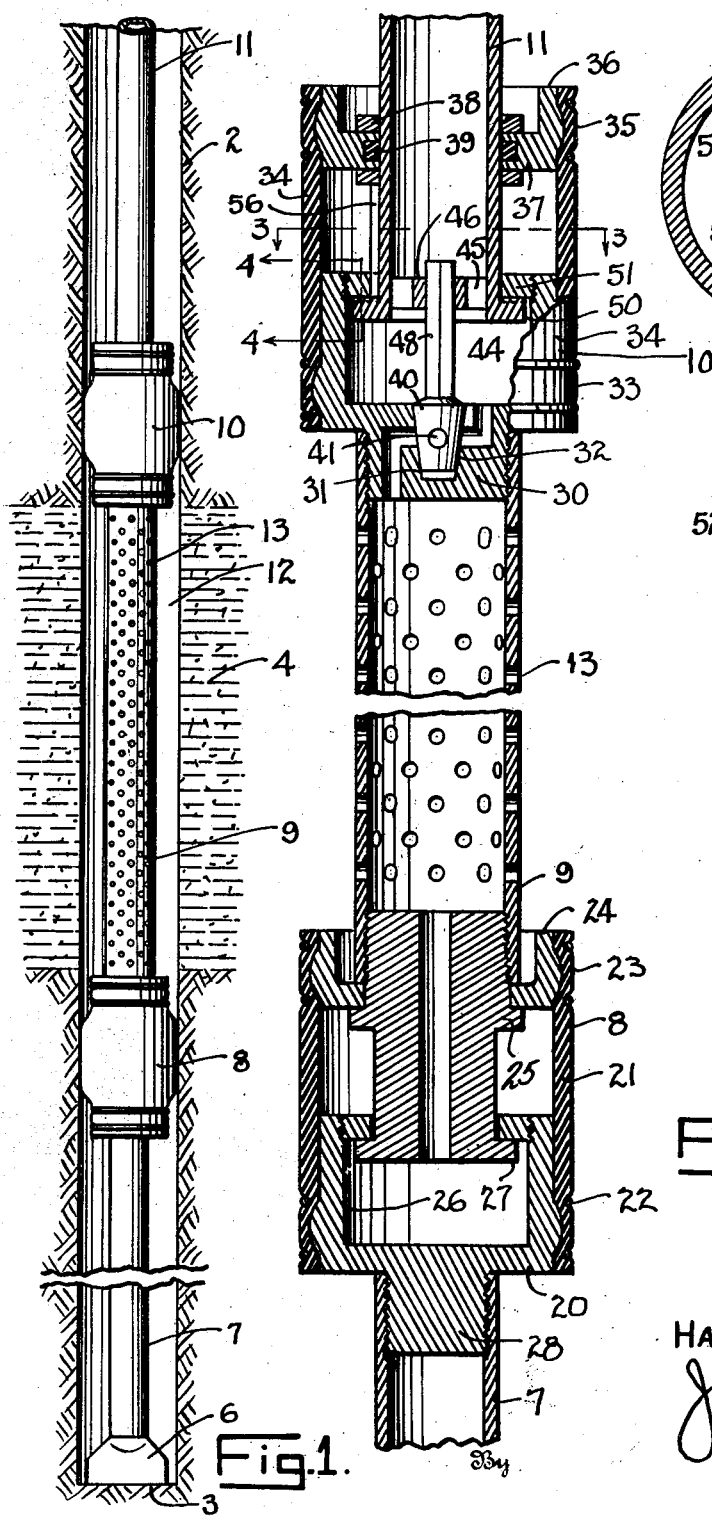
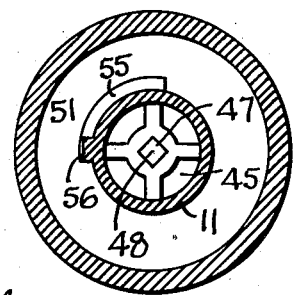
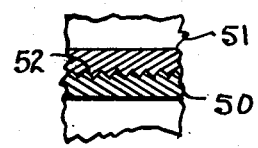
Inventor
HARVEY WHITAKER.
Jesse R. Stone
Lester B. Clark
Attorneys.

Patented Dec. 12, 1939

2,182,888

UNITED STATES PATENT OFFICE 2,182,888

OPEN HOLE FORMATION TESTER

Harvey Whitaker, San Antonio, Tex.

Application May 7, 1937, Serial No. 141,213

4 Claims. (Cl. 166—1)

The invention relates to a testing tool by which a sample is withdrawn from the formation in order to determine the desirable or undesirable qualities thereof.

Various types of tester or sampling tools have been heretofore devised but the present tool is better adapted for taking samples of the formation in what is generally known as an open hole. The prior practice has been to drill the well bore of uniform diameter until an elevation closely adjacent a suspected productive formation is encountered.

At this elevation the diameter of the hole is reduced and what is known as a rat hole is then drilled into the producing formation. The testing tool is then introduced into the hole and seated upon the shoulder between the rat hole and the full gauge hole so that a seal is obtained and the tool can then be opened in order to obtain a sample from the rat hole.

This operation obviously entails the drilling of the small diameter hole and other unnecessary operations when a tool of the present type is considered because with the present tool it is intended that a seal can be formed anywhere in the standard gauge hole at spaced points so that a sample of the formation between the seals can be obtained.

It is the present practice to also make an electrical resistivity test of the formation through which the well bore has been drilled, and the present tool is adapted for use in conjunction with said test in order to obtain a more positive indication of exactly the type of formation which has been detected by these electrical surveys.

It is one of the objects of the invention to provide a testing tool having a pair of spaced packers thereon which may be set so as to seal off a productive formation from which a sample can be obtained.

Another object of the invention is to provide a full hole formation testing tool.

Another object of the invention is to provide an open hole tester wherein a seal may be formed with the wall of the well bore at spaced points so as to obtain a sample of the formation between those points.

Still another object of the invention is to provide a testing tool wherein a pair of spaced packers may be set by longitudinal movement of the operating string of pipe and the tool thereafter opened or closed in order to entrap a sample of the formation.

Another object of the invention is to provide a tool which may be readily set and removed from the well bore without damage, whereby the obtaining of a sample of the formation is insured.

Other and further objects of the invention will be readily apparent when the following description is considered in connection with the accompanying drawing wherein:

Fig. 1 is a diagrammatic elevation of the tool disposed in a well bore in operating position to obtain a sample of the formation.

Fig. 2 is a vertical sectional view of the tool showing the internal construction and arrangement of the packers and the control valve.

Fig. 3 is a section on the line 3—3 of Fig. 2 and looking in the direction of the arrows.

Fig. 4 is a section taken on the line 4—4 looking in the direction of the arrows and showing the detail of the contact between the parts in order to prevent relative rotation.

In Fig. 1 the well bore is indicated generally at 2 and extends into the well where it terminates at 3. This well bore has penetrated a productive formation 4, which it is desired to test, and the testing tool is shown as being located within the well bore 2 and ready to obtain a test or sample of the formation 4.

Generally the tool is assembled by the use of a plug 6 on the lower end thereof to which any desired number of sections of pipe 7 may be connected. This intermediate pipe length will be such that the lower packer 8 will be directly below the elevation of the bottom of the producing formation 4, which is to be tested. Connected to the lower packer 8 is the inlet pipe 9, which is in turn connected to the upper packer 10 and to the operating string 11.

Preferably, in operation the device is lowered into the well bore so that the plug 6 engages the bottom 3 of the hole and then the weight of the operating string 11 is lowered into the device so as to expand the packers 8 and 10. Rotation of the operating string 11 then serves to open the tool so that there can be an inflow from the formation 4 between the packers 8 and 10 in the area 12. A plurality of openings 13 are provided in the pipe 9 so that the fluid may enter the pipe and flow upwardly through the operating string 11 where it may be trapped.

The details of the construction are best seen in Fig. 2 where the pipe 7 serves as a support for the base 20 of the packer 8. The resilient sealing portion 21 of the packer is fixed to the base 20 by suitable retainer bands or wires 22. This sealing member 21 may be of any desired length and has its upper end 23 connected to the setting ring 24. A choke nipple 27 is threaded into the lower end of the pipe 9. The sealing member 21 is expanded radially due to relative longitudinal movement between the base 20 and the setting ring 24. This movement is caused by longitudinal movement of the pipe 9 to which the setting ring 24 is fixed by means of the flange 25 on the nipple 27. The base 20 is recessed at 26 in order to receive the enlarged end 27 on the lower end of the pipe 9, and in this manner when the pipe 9 moves downwardly the sealing member 21 will be expanded as seen in Fig. 1. The base 20 is preferably solid at 28 so that there can be no flow of fluid downwardly therethrough nor upwardly into the testing tool.

The pipe 9 may be of any desired length and have any desired number of openings 13 therein.

The upper end of the pipe 9 is fixed to a valve member 30 which has a passage 31 therethrough and a valve seat 32 therein. This valve member 30 also serves as a support for the lower end 33 of the sealing member 34 which forms the upper packer 10. The packer 10 is constructed the same as the packer 8 by having its upper end 35 attached to a setting ring 36 which is arranged for longitudinal movement by virtue of the flange 37 thereof being confined between the ribs 38 which are formed on the periphery of the pipe 11. A suitable packing 39 may be disposed in the flange 37 if desired to prevent leakage.

Relative longitudinal movement between the pipe 11 and the base or valve member 30 serves to expand the packing member 34 the same as it is in connection with the lower packer.

The movement of the stem 11 has another function, however; namely, that of operating the valve 40 which engages the valve seat 32. This valve 40 is in the form of a plug valve having an opening 41 therethrough which may be moved into or out of alignment with the passage 31. As seen in Fig. 2 the valve is closed, and when the valve is rotated through a quarter turn from the position shown in Fig. 2 the opening 41 will be aligned with the opening 31 and there may be a flow of fluid through the valve member 30, through the chamber 34 and thence upwardly through the openings 45 into the operating pipe 11. In order that the valve 40 will rotate with the pipe 11 a spider 46 is fixed in the lower end of the pipe 11 and has a non-circular opening 47 therein which will receive the non-circular stem 48 on the valve 40.

It will be remembered that the pipe 11 must have longitudinal movement relative to the valve 40 and the non-circular arrangement permits vertical sliding of the spider 46 on the stem 48.

In order that there will be no relative longitudinal movement between the pipe 11 and the pipe 9 while the pipe is being lowered into or removed from the well bore the resiliency of the packing 34 is used to retain the flange 50 on the lower end of the pipe 11 in engagement with the flange 51 on the base or valve member 30. These parts are best seen in Fig. 4 as having the interengaging tooth faces 52 so that when these two flanges are moved into engagement there can be no relative rotation.

After the pipe 11 has been moved longitudinally, however, the teeth move apart and then there can be relative rotation of the pipe 11 and the valve 40 with respect to the valve seat 42 so as to open the valve. In order that this amount of rotation will be limited, however, a quadrant recess 55 has been provided in the flange 51 and a key 56 has been fixed on the periphery of the pipe 11 to ride in this quadrant and limit the rotation. This construction is seen in Fig. 3.

In order that this rotation may occur without turning of the packing 10 it will be observed that the flange 37 is rotatable between the flanges 38.

In operation, the tool will be lowered into the well bore, the plug 6 seated on the bottom of the bore and the weight of the operating string 11 lowered on the device sufficiently to expand the packers 8 and 10. The string 11 can then be rotated to open the valve 40 so that there will be an inrush of fluid from the formation into the operating string 11, it being understood that the string 11 will be empty when it is lowered into the well bore so that any pressure on the formation will cause a flow of fluid into the tool.

When the desired sample has been obtained a quarter of a turn rotation of the pipe 11 in the reverse direction tends to close the valve, and lifting the weight of the string 11 will then allow the packers 10 and then 8 to collapse so that the device may be readily withdrawn from the well bore with the sample of fluid.

What is claimed is:

1. A tool of the character described comprising a pair of spaced packers, telescoping connections in each of said packers adapted for movement when a predetermined weight is applied to said packers, a perforate pipe having one end fixed to each of said packers, an operating string of pipe to set said packers by longitudinal movement thereof and of said perforated pipe, and valve means to control the entry through said tool to said string of pipe upon relative rotation of said string and said packers.

2. A combination packer and control valve for well testers comprising a body, a packing having one end fixed thereon, a pipe slidably disposed in said body, means to rotatably connect the other end of said packing to said pipe, a valve seat in said body, a plug valve in said seat, a slidable non-rotatable connection between said pipe and said valve, and means to limit the relative rotation of said pipe and body to open and close said valve.

3. A combination packer and control valve for well testers, comprising a body, a packing having one end fixed thereon, a pipe slidably disposed in said body, means to rotatably connect the other end of said packing to said pipe, a valve seat in said body, a plug valve in said seat, a slidable non-rotatable connection between said pipe and said valve, means to limit the relative rotation of said pipe and body to open and close said valve, and a second packer connected to said body and adapted to be set by movement of said body after the setting of said first packer by longitudinal sliding movement of said pipe.

4. A formation tester including a perforate section, a packer fixed to each end thereof, an operating string of pipe slidably and rotatably connected to said section, means on said pipe and the upper packer to expand the packer on sliding of the pipe into said section, a valve to be opened to admit fluid to the pipe from the section upon rotation of the pipe, and additional means connected to the lower end of the other packer to contact the well bottom and expand said second packer when said section is lowered.

HARVEY WHITAKER.